Jan. 6, 1942. W. O. N. SÖDERQVIST 2,269,132
CLAMPING SLEEVE
Filed June 3, 1939
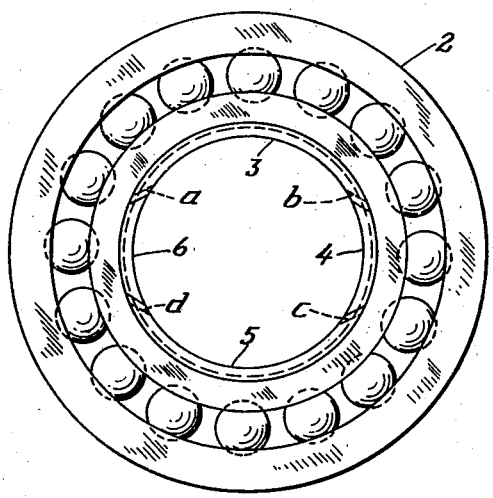
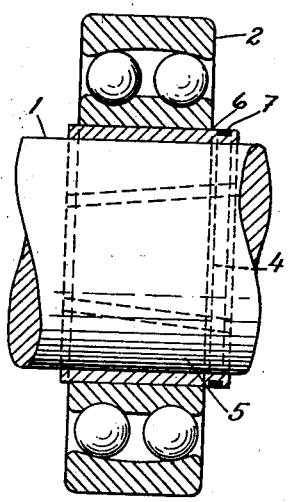
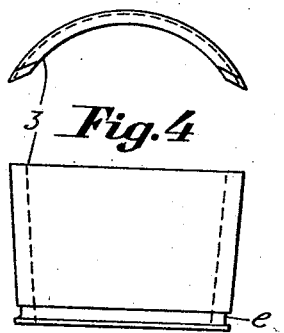
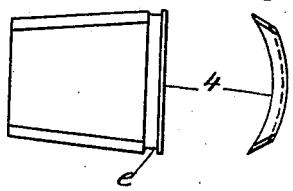
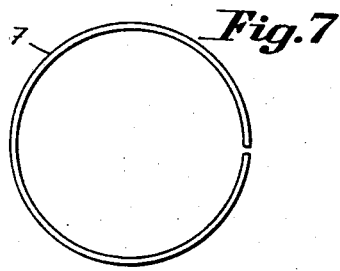

Patented Jan. 6, 1942

2,269,132

UNITED STATES PATENT OFFICE 2,269,132

CLAMPING SLEEVE

William Oskar Nicolaus Söderqvist, Lidkoping, Sweden

Application June 3, 1939, Serial No. 277,172
In Sweden June 4, 1938

1 Claim. (Cl. 287—52)

The present invention refers to a clamping sleeve adapted to secure ball or roller bearings, pulleys or other machine elements onto a shaft, so that these parts will at the same time take a centered or concentric position relatively to the shaft. The sleeve may according to the invention also be used to advantage as a brake or friction coupling.

The objects and advantages of my invention will be apparent from the following description considered in connection with the accompanying drawing which forms a part of this specification, and of which:

Fig. 1 is a plan view of a ball bearing viewed from the one side thereof provided with a clamping sleeve according to my invention;

Fig. 2 is a cross section of said bearing with a clamping sleeve inserted therein and surrounding a shaft;

Fig. 3 shows a member of the clamping sleeve viewed from the one end thereof;

Fig. 4 shows said member in elevation;

Figs. 5 and 6 show another member of the clamping sleeve viewed from the one end thereof and in elevation, respectively;

Fig. 7 shows an annular spring clip intended to prevent relative displacement in an axial direction of the members of the sleeve.

In the drawing, I designates a shaft onto which the sleeve is clamped, 2 is an outer ball bearing race and 3, 4, 5 and 6 are the members of which the clamping sleeve consists. In the embodiment shown, this sleeve comprises four members axially displaceable relatively to each other, although the number of the members may of course vary. These members are provided with longitudinal bevelled-off wedge-shaped edges which when assembled on a shaft overlap the edges of the adjacent sleeve members so as to form junctures a, b, c, and d, as shown in Fig. 1, and, secondly, the longitudinal edges of the sleeve members are bevelled off to some extent at an acute angle to the end plane of the sleeve. The longitudinal edges of the sleeve members are bevelled in such a manner that, when all of the members are assembled about a shaft, the juncture surfaces extend close adjacent to each other while overlapping one another, and in the example shown, two diametrically opposed sleeve members will then be brought with their bevelled-off edges inside the externally located bevelled-off edges of two diametrically opposed sleeve members. The broadwise bevelling of the sleeve members is performed so that two opposed sleeve members taper somewhat toward the one end, whereas the sleeve members bearing thereon taper in the opposite direction. At an axial displacement of the sleeve members relatively to each other on a shaft, two diametrically opposed sleeve members will therefore be wedged outwardly in a radial direction from the shaft, while two diametrically opposed sleeve members will be wedged inwardly toward the shaft. If two opposed sleeve members be displaced by the same amount in an axial direction relatively to the other two opposed sleeve members, the sleeve will be centered so that, for instance, a ball bearing or a pulley arranged on the circumference thereof will be concentric with the shaft. By displacing two diametrically opposed sleeve members relatively to the two adjacent, diametrically opposed members by light tapping, it will thus be possible concentrically to clamp a machine element, such as a pulley or a ball bearing, onto the shaft with sufficient force to withstand the torque but it is of course also possible to provide any one of the sleeve members with a groove and a tongue entering a key-way in the shaft.

Figs. 4 and 5 show a groove e turned into the ends of the sleeve members. The groove extending circumferentially about all of the members comprised in the sleeve in the peripheral portion theerof is adapted to engage an annular spring clip 7, in order to lock the members and prevent them from being displaced in an axial direction relatively to each other after the sleeve has become clamped. The clamping bush or sleeve according to the invention may also, with special means for the displacement of the bush members with respect to each other, be used as a brake or friction coupling, for instance between a shaft and a pulley or the like arranged thereon.

The number of members of the clamping sleeve is obviously not limited to four, but may be increased according to requirements and circumstances, for instance, to six, eight, ten, and so forth. The greater the number of sleeve members used in a sleeve, the more powerful will the braking or wedge effect become at the displacement or jamming of the members against one another, since at every wedge juncture each other sleeve member will be pressed inwardly toward the shaft and each other member outwardly against a machine element surrounding the shaft. The pressure between the shaft and the surrounding machine element will thus be rigid at the junctures, whereas it will be resilient between the junctures.

What I claim is:

In a device for locking telescoping inner and outer elements together, two groups of arcuate wedge-shaped members disposed between said elements, the members of one group forming wedge-shaped spaces therebetween within which are located the wedge-shaped members of the other group, outwardly inclined bevel surfaces formed on the axially extending edges of the members of the first mentioned group and inwardly inclined bevel surfaces on the axially extending edges of the second mentioned group engaging said outwardly facing surfaces, the members of the groups being located in such uniformly distributed relation to each other around said inner element that when the members of the respective groups are displaced in axial direction with respect to each other, the members of said second group are pressed outwardly against said outer element and the members of said first group are pressed inwardly against said inner element through the combined action of the wedge taper and the bevel surfaces to lock the outer element in concentric position on the inner element.

WILLIAM OSKAR

NICOLAUS SÖDERQVIST.